US012314074B2

(12) United States Patent
Rasmussen

(10) Patent No.: US 12,314,074 B2
(45) Date of Patent: May 27, 2025

(54) STEERING COMMAND MEANS

(71) Applicant: Danfoss Power Solutions ApS, Nordborg (DK)

(72) Inventor: Søren Winkler Rasmussen, Sønderborg (DK)

(73) Assignee: DANFOSS POWER SOLUTIONS APS, Nordborg (DK)

( * ) Notice: Subject to any disclaimer, the term of this patent is extended or adjusted under 35 U.S.C. 154(b) by 1023 days.

(21) Appl. No.: 16/654,299

(22) Filed: Oct. 16, 2019

(65) Prior Publication Data

US 2020/0125130 A1 Apr. 23, 2020

(30) Foreign Application Priority Data

Oct. 18, 2018 (DE) ......................... 102018125855.0

(51) Int. Cl.
*G05G 1/04* (2006.01)
*G05G 9/04* (2006.01)
*G05G 9/047* (2006.01)

(52) U.S. Cl.
CPC ............... *G05G 1/04* (2013.01); *G05G 9/047* (2013.01); *G05G 2009/04766* (2013.01)

(58) Field of Classification Search
CPC .. G05G 1/04; G05G 1/06; G05G 1/10; G05G 1/12; G05G 2009/04722; G05G 2009/04766; G05G 2009/04774
See application file for complete search history.

(56) References Cited

U.S. PATENT DOCUMENTS

| | | | | |
|---|---|---|---|---|
| 2,762,234 | A * | 9/1956 | Dodd | G01S 1/02 74/519 |
| 6,170,598 | B1 * | 1/2001 | Furukawa | A61G 5/043 180/333 |
| 6,320,284 | B1 * | 11/2001 | Fontana | G05G 9/047 310/12.04 |
| 7,675,258 | B2 | 3/2010 | Dattilo et al. | |
| 8,887,597 | B2 * | 11/2014 | Black | G05G 1/06 74/523 |
| 10,099,664 | B2 * | 10/2018 | Levich | G05G 1/04 |

(Continued)

FOREIGN PATENT DOCUMENTS

| | | |
|---|---|---|
| CN | 1795114 A | 6/2006 |
| CN | 1825241 A | 8/2006 |

(Continued)

OTHER PUBLICATIONS

Machine translation of DE 102017209745 A1 obtained on Nov. 25, 2024.*

(Continued)

*Primary Examiner* — Adam D Rogers
(74) *Attorney, Agent, or Firm* — McCormick, Paulding & Huber PLLC

(57) ABSTRACT

A steering command means (1) is described comprising a joystick (2) and an arm rest (3) having an arm support surface (4), wherein the joystick (2) comprises a handle member (5) and a grip surface (6) is located on a circumference of the handle member (5). A risk of unintended steering input in a vibrating environment should be minimized. To this end an axis (9) of rotation of the handle member (5) runs through a space surrounded by the grip surface (6).

20 Claims, 1 Drawing Sheet

(56) References Cited

U.S. PATENT DOCUMENTS

| | | | | |
|---|---|---|---|---|
| 11,098,735 | B2 * | 8/2021 | Slightam | B66F 11/044 |
| 2004/0133322 | A1 | 7/2004 | Chernoff et al. | |
| 2008/0023250 | A1 * | 1/2008 | Hefner | G05G 1/08<br>180/332 |
| 2008/0250889 | A1 * | 10/2008 | Mack | B60K 20/02<br>74/471 XY |
| 2010/0050803 | A1 | 3/2010 | Stamate et al. | |
| 2013/0074645 | A1 | 3/2013 | Hakansson et al. | |

FOREIGN PATENT DOCUMENTS

| | | | | |
|---|---|---|---|---|
| CN | 105882772 | A | 8/2016 | |
| CN | 107934844 | A | 4/2018 | |
| DE | 19956870 | A1 * | 6/2001 | B62D 1/02 |
| DE | 102005054474 | A1 | 5/2007 | |
| DE | 102007018246 | A1 | 10/2008 | |
| DE | 102017209745 | A1 | 12/2018 | |
| JP | 2000-302056 | A | 10/2000 | |
| JP | 2017100523 | A | 6/2017 | |
| WO | WO-03025394 | A2 * | 3/2003 | G05G 9/047 |
| WO | WO-2018159210 | A1 * | 9/2018 | |
| WO | WO-2019134735 | A1 * | 7/2019 | G05G 9/047 |

OTHER PUBLICATIONS

Machine translation of WO 2018/159210 A1 obtained on Nov. 25, 2024.*

First Examination Report for Indian Patent Application No. 201914038555 dated Jan. 5, 2021.

* cited by examiner

STEERING COMMAND MEANS

CROSS-REFERENCE TO RELATED APPLICATION

This application claims foreign priority benefits under 35 U.S.C. § 119 to German Patent Application No. 102018125855.0 filed on Oct. 18, 2018, the content of which is hereby incorporated by reference in its entirety.

TECHNICAL FIELD

The present invention relates to a steering command means comprising a joystick and an arm rest having an arm support surface, wherein the joystick comprises a handle member and a grip surface is located on a circumference of the handle member.

BACKGROUND

Such a steering command means is known, for example, from U.S. Pat. No. 7,675,258 B2.

An operator steering a vehicle equipped with such a steering command means has to tilt the handle member to the left or to the right depending on the desires steering direction.

A problem often exists in a vibrating environment, like in a working machine, because the possibility exists that the operator unintentional could move the joystick in a not intended direction.

Furthermore, the use of such a steering command means is exhausting for the operator so that the operator will be quite tired after a period of working.

SUMMARY

The object underlying the invention is to minimize the risk of unintended steering input in a vibrating environment.

This problem is solved with a steering commend means as described at the outset in that an axis of rotation of the handle member runs through a space surrounded by the grip surface.

During operation the operator grips the handle member at the grip surface. In other words, the palm of the hand of the operator contacts the grip surface of the handle member and accordingly the axis of rotation of the handle member is located inside the palm. The unintended steering input can greatly be reduced. The joystick can be handled in an ergonomic manner. The operator has only to twist the wrist at steering input which is less stressful than moving the forearm.

In an embodiment of the invention the handle member is connected to the arm wrist via a rod, wherein the rod protrudes from an area of the arm rest below or at the level of the arm support surface. The operator can leave the forearm on the arm rest with the hand protruding over the arm wrest into a position in which the handle member is located. The handle member then is automatically in the right position to be gripped by the hand of the operator.

In an embodiment of the invention an angle between the rod and the arm support surface is adjustable. The position of the handle member can be adapted to a specific operator. Once the angle has been adjusted, the angular position of the rod can be fixed.

In an embodiment of the invention the angle is in a range from −30° to +30°. This is usually sufficient to adapt the steering command means to many operators.

In an embodiment of the invention the rod has an adjustable length. The rod can be adjusted to different lengths of the forehand for different operators.

In an embodiment of the invention the handle member is rotatable around the axis of rotation by 150°. This is a rather large turning angle allowing a correspondingly high resolution of the steering command. Conventional joysticks allow tilting over an angle of 18° to 45° only.

In an embodiment of the invention the only possible movement of the handle member is a rotation. The handle member fulfils the function of a steering wheel, however, with a more comfortable way of actuation.

In an embodiment of the invention an electric machine is arranged within the handle member. The electric machine can be used for a plurality of purposes as will be explained below. Since the electric machine is arranged within the handle member, additional constructional space is not necessary.

In an embodiment of the invention the electric machine comprises a stator connected to the rod and a rotor connected to the handle member.

In an embodiment of the invention the rotor comprises a magnet arrangement. The magnet arrangement comprises a number of permanent magnets. Accordingly, no supply of current to the rotor is necessary so that the construction of the electric machine can be kept simple.

In an embodiment of the invention the magnet arrangement is attached to the inside of the handle member. This is a simple construction. The inside of the handle member is, for example, accessible from a front face of the handle member.

In an embodiment of the invention the electric machine is in form of a BLDC-motor (brushless DC electric motor). A BLDC-motor is a simple kind of an electric motor which can be controlled to produce a predetermined torque or can be rotated to a predetermined angle. Accordingly, the motor can be used to produce a force feedback or a motor can be used to drive the vehicle equipped with such a steering command means automatically, for example, via a global positioning system supported steering system. Instead of a BLDC-motor any other suitable motor can be used, for example a PMSM-motor (Permanent magnet synchronous motor).

In an embodiment of the invention the electric machine outputs an angular position signal. The same machine can be used as motor and as angle sensor at the same time.

In an embodiment of the invention the handle member is at least partly of cylindrical form. This gives a comfortable feeling for the operator. Furthermore, it simplifies mounting of the electric machine within the handle member. In an embodiment of the invention at least one push-button is arranged at the handle member. The push-button can be used, for example, for a horn, for lights or for turning lights.

BRIEF DESCRIPTION OF DRAWINGS

An embodiment of the invention will now be described in more detail with reference to the drawing, wherein.

DETAILED DESCRIPTION

Figure 1:
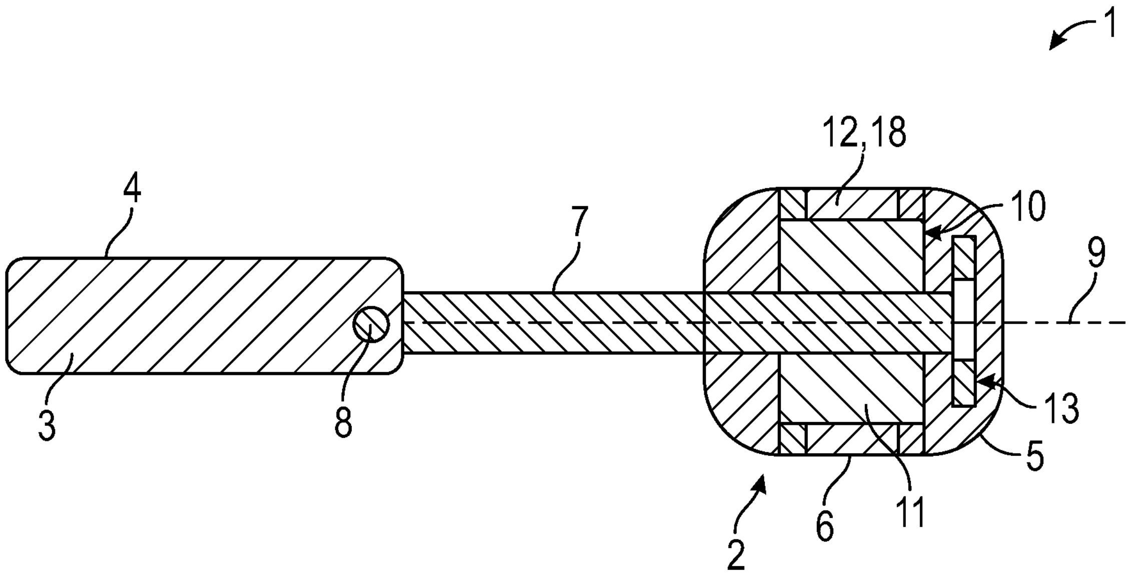
FIG. 1 shows a side view of a steering command means.

A steering command means 1 comprises a joystick 2 and an arm rest 3 having an arm support surface 4. The joystick 2 comprises a handle member 5. A grip surface 6 is located on a circumference of the handle member 5. The grip surface 6 is a surface which is contacted by the palm of the hand of an operator using the steering command means to steer a vehicle equipped with the steering command means 1.

The handle member 5 is connected to the arm rest 3 via a rod 7. The rod 7 protrudes from an area of the arm rest 3 below the arm support surface 4. Alternatively, the rod can be at the same level as the arm support surface.

Schematically shown is a hinge 8 with which the rod 7 is connected to the arm rest 3. Accordingly, it is possible to adjust an angle between the rod 7 and the arm support surface 4. This angle is in a range from −30° to +30°. Once the desired angle has been adjusted, the angular position of the rod 7 with respect to the arm support surface 4 is fixed. This fixation can be made releasable, so that another operator can adjust another angle.

The length of the rod 7 can be adjusted to vary a distance between the arm rest 3 and the handle 6 so that it can be adjusted to different lengths of forehand for different operators. To this end, the rod itself can be of telescopic form. Alternatively, the rod 7 can be shifted more or less into the arm rest 3. In both cases it is advantageous to fix the adjusted length.

The handle member 6 is rotatable around an axis 9 which corresponds to a longitudinal axis of the rod 7. It is possible to rotate the handle member 6 by 150° around the axis 9, i. e. by 75° to the left and by 75° to the right. This gives a correspondingly high resolution with the consequence of a rather sensitive steering behaviour.

The only movement possible for the handle member 6 is a rotation. Accordingly, the work load for the operator can be kept low.

The position of the handle member 6 in relation to the arm support surface 4 allows for rather ergonomic working position. The operator can rest the forearm on the arm rest 3, more precisely on the arm support surface 4 of the arm rest 3, while the hand can grip the handle member 6 of the joystick 2. In this position it is only necessary that the operator rotates his wrist in order to turn the handle member 6.

An electric machine 10 is arranged within the handle member 6. The electric machine 10 comprises a stator 11 and a rotor 12. The stator 11 is connected to the rod 7 and the rotor 12 is connected to the handle member. The rotor 12 comprises a magnet arrangement 18 having a plurality of permanent magnets. The magnet arrangement 18 is attached to the inside of the handle member 6.

In this way it is possible to have the electric machine in form of a BLDC-motor. The electric machine can be controlled by means of a printed circuit board 13 which is, for example, arranged on the tip of the of the rod 7. The electric machine 10 can be used, for example, to create a force feedback. To this end the electric machine 10 is in form of a high torque low speed motor. The rotor 11 of the electric machine comprises a number of coils, wherein each coil is wound around an iron core. The winding axis of the coils is, for example, arranged radially with respect to the axis 9 of rotation. A current supply to the coils is controlled by the printed circuit board 13.

The electric machine can be used at the same time as an angle sensor outputting a signal indicative of angular position of the handle member 6 with respect to the rod 7.

Since the complete electric equipment can be arranged within the handle member 6 it is only necessary to have a few lines for the energy supply and a few lines for a bus signals which lines can easily be accommodated in the arm rest.

At least one push button 14-17 is arranged at the handle member 5. The push buttons 14, 15 can be used to operate a turning light. The push button 16 can be used to switch on or off a light of the vehicle. The push button 17 can be used to actuate a horn of the vehicle.

Figure 2:
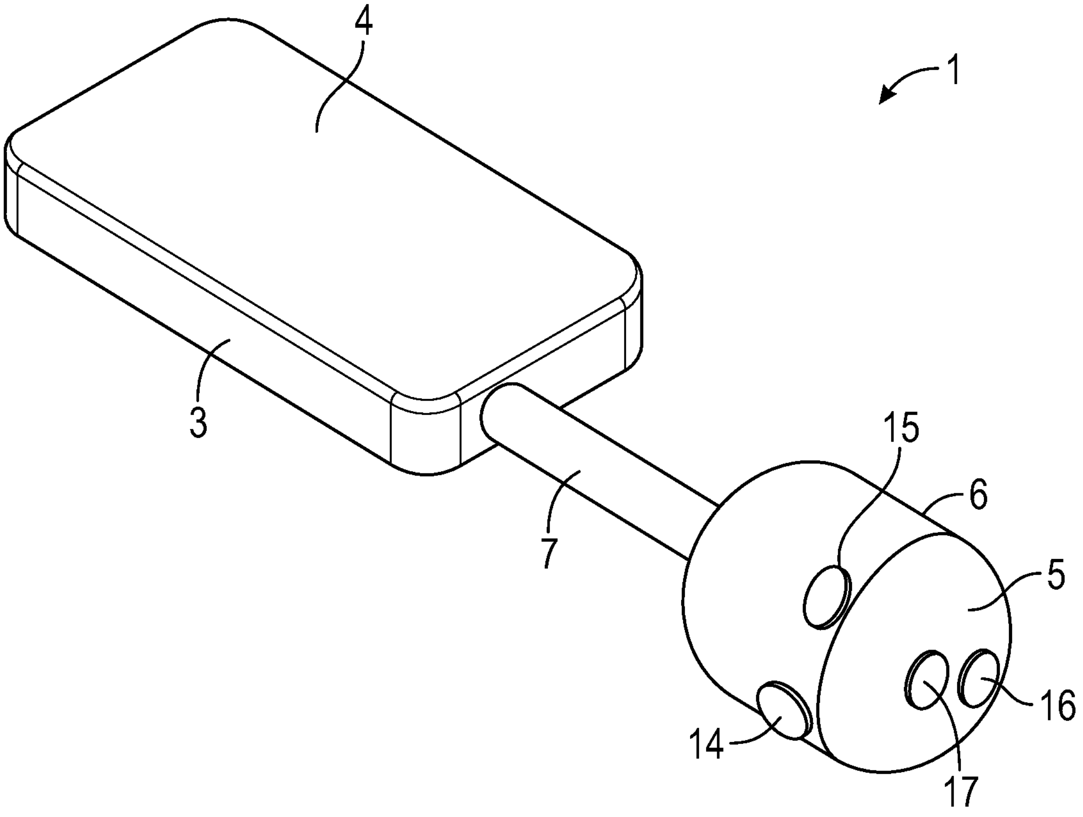
FIG. 2 shows a perspective view of the steering command means.

As can be seen in particular in FIG. 2, the handle member 5 is at least partly of cylindrical form. This gives a comfortable feeling for the operator.

The construction shown in FIG. 2 could be delivered as a single unit which was then placed on an already existing arm rest 3 of a vehicle. It is only necessary to connect the electrical wires.

In all embodiments the electrical wires and the bus connection wires can be led through the rod 7 and, if necessary or desired, through the arm rest 3.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A steering command means comprising a joystick and an armrest having an arm support surface, wherein the joystick comprises a handle member and a grip surface is located on a circumference of the handle member, wherein an axis of rotation of the handle member runs through a space surrounded by the grip surface, wherein the handle member is connected to the armrest via a rod, wherein the axis of rotation of the handle member corresponds to a longitudinal axis of the rod, and wherein the joystick is configured such that the only possible movement of the handle member is a rotation around the axis of rotation.

2. The steering command means according to claim 1, wherein the rod protrudes from an area of the armrest below or at the level of the arm support surface.

3. The steering command means according to claim 2, wherein the rod has an adjustable length.

4. The steering command means according to claim 2, wherein the handle member is rotatable around the axis of rotation by 150°.

5. The steering command means according to claim 2, wherein an angle between the rod and the arm support surface is adjustable.

6. The steering command means according to claim 5, wherein the rod has an adjustable length.

7. The steering command means according to claim 5, wherein the angle is in a range from −30° to 30°.

8. The steering command means according to claim 7, wherein the rod has an adjustable length.

9. The steering command means according to claim 5, wherein the handle member is rotatable around the axis of rotation by 150°.

10. The steering command means according to claim 1, wherein an electric machine is arranged within the handle member.

11. The steering command means according to claim 10, wherein the electric machine comprises a stator connected to the rod and a rotor connected to the handle member.

12. The steering command means according to claim 11, wherein the rotor comprises a magnet arrangement.

13. The steering command means according to claim 12, wherein the magnet arrangement is attached to the inside of the handle member.

14. The steering command means according to claim 10, wherein the electric machine is in form of a brushless DC electric motor.

15. The steering command means according to claim 10, wherein the electric machine outputs an angular position signal.

16. The steering command means according to claim 1, wherein the rod has an adjustable length.

17. The steering command means according to claim 1, wherein the handle member is rotatable around the axis of rotation by 150°.

18. The steering command means according to claim 1, wherein the handle member is at least partly of cylindrical form.

19. The steering command means according to claim 1, wherein at least one push-button is arranged at the handle member.

20. A steering command means comprising a joystick and an armrest having an arm support surface, wherein the joystick comprises a handle member and a grip surface is located on a circumference of the handle member, wherein an axis of rotation of the handle member runs through a space surrounded by the grip surface, wherein an electric machine is arranged within the handle member, and wherein the electric machine comprises a stator connected to a rod and a rotor connected to the handle member.

* * * * *